United States Patent [19]
Lampe et al.

[11] Patent Number: 5,305,596
[45] Date of Patent: Apr. 26, 1994

[54] METHOD FOR PREVENTING LEAN FLAEOUT AT IGNITION OF A STORED ENERGY SYSTEM FOR DRIVING A TURBINE WHEEL

[75] Inventors: Steven Lampe; Timothy David; Jack R. Shekleton, all of San Diego, Calif.

[73] Assignee: Sundstrand Corporation, Rockford, Ill.

[21] Appl. No.: 964,360

[22] Filed: Oct. 21, 1992

Related U.S. Application Data

[62] Division of Ser. No. 643,349, Jan. 22, 1991, abandoned.

[51] Int. Cl.$^5$ .............................. F02C 3/00
[52] U.S. Cl. .................. 60/39.06; 60/39.141; 60/734
[58] Field of Search ............. 60/39.141, 39.142, 39.27, 60/734, 740, 741, 39.06

[56] References Cited

U.S. PATENT DOCUMENTS

| | | | |
|---|---|---|---|
| 2,986,883 | 6/1961 | Li | 60/734 |
| 4,590,768 | 5/1986 | Halvorsen et al. | 60/741 |
| 4,777,793 | 10/1988 | Weigand et al. | 60/727 |

FOREIGN PATENT DOCUMENTS 2851401  5/1979  Fed. Rep. of Germany ........ 60/734

OTHER PUBLICATIONS

Lefebvre, Arthur H. *Gas Turbine Combustion*, New York, N.Y. McGraw Hill, 1983, pp. 412–413.

*Primary Examiner*—Richard A. Bertsch
*Assistant Examiner*—Timothy S. Thorpe
*Attorney, Agent, or Firm*—Wood, Phillips, VanSanten, Hoffman & Ertel

[57] ABSTRACT

Lean flameout upon ignition in a turbine system including a turbine wheel (10) driven by motive gases including gases of combustion from a combustor (20) may be avoided by locating an orifice (130) downstream of the servo/ΔP valve (52) that controls fuel flow to the fuel inlet (22) of the combustor (20).

2 Claims, 1 Drawing Sheet

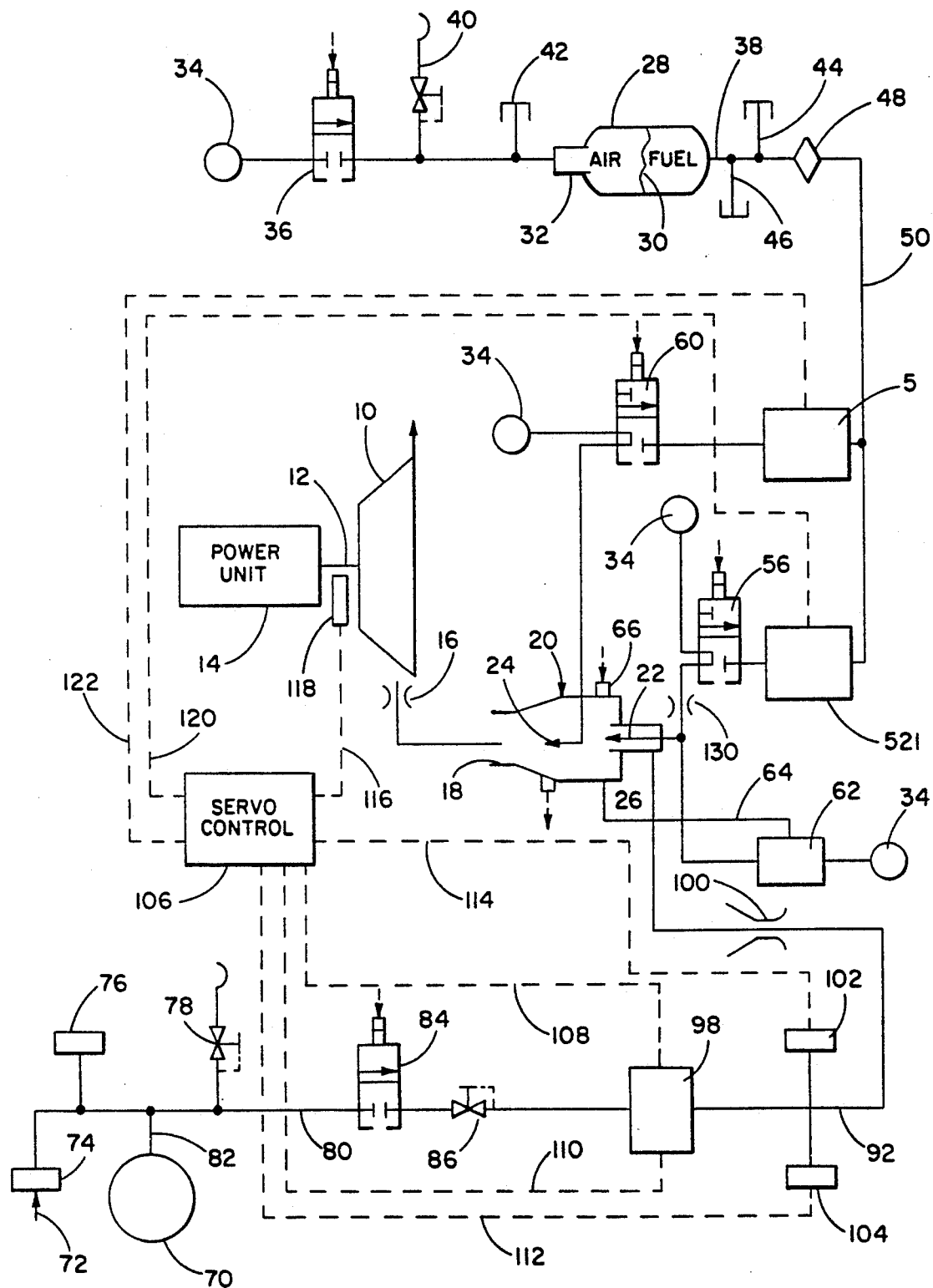

METHOD FOR PREVENTING LEAN FLAEOUT AT IGNITION OF A STORED ENERGY SYSTEM FOR DRIVING A TURBINE WHEEL

This is a division of application Ser. No. 643,349 filed Jan. 22, 1991 now abandoned.

FIELD OF THE INVENTION

This invention relates to so-called stored energy systems wherein stored fuel and oxidant are combusted to provide motive gases to drive a turbine wheel as in starting or operating an auxiliary power unit or an emergency power unit.

BACKGROUND OF THE INVENTION

Both commercial and miliary aircraft typically carry auxiliary power units (APU) and often additionally may utilize a so-called emergency power unit (EPU). In some instances, the functions of both are combined.

In emergency systems, EPUs, or APUs that operate additionally as EPUs must be brought into full operational capacity in a relatively short period of time, such as two or three seconds. In the usual case, these systems employ a turbine wheel for driving emergency power sources such as an electrical generator, a hydraulic pump or both so as to provide the energy necessary to continue to operate the aircraft. Consequently, it is necessary that the turbine wheel be accelerated up to normal operating speed in a relatively short period of time so that if an APU is being utilized to provide emergency power, it can reach a self sustaining speed. Where an EPU is being utilized, it still must be accelerated rapidly and then its operation maintained for some predetermined time period.

Because these systems are intended for operation in emergency conditions, it is necessary that they have an extremely high degree of reliability. One obviously necessary feature is the ability to start rapidly without fail and maintain operation for the desired time period.

As noted above, these systems typically employ a turbine wheel, or even a complete turbine engine to drive the emergency power sources. Thus, in order that there be reliable starting of the system, ignition of fuel in a combustor feeding the turbine wheel must be reliably had and the continued combustion of the fuel maintained over the desired period of operation.

As is typical with many turbine systems, the control of fuel flow is achieved by a so-called ΔP valve. ΔP valves conventionally include a variable orifice along with a valve that is operable, in response to command from a fuel control system, to control the pressure drop across the orifice. Thus, for a given pressure drop, a constant fuel flow will be assured.

These valves typically respond to increases or decreases in pressure downstream of the valve as is well-known. As a consequence, in some cases, the pressure rise within a combustor associated with a turbine wheel to be driven and fueled by fuel via the ΔP valve will result in a lesser pressure drop across the ΔP valve which in turn means a reduction in fuel flow until the valve responds. Consequently, a lean flameout may result immediately after ignition where valve response to the pressure surge of ignition is slow, and intolerable situation in a piece of equipment adapted for emergency use.

The present invention is directed to overcoming one or more of the above problems.

SUMMARY OF THE INVENTION

It is the principal object of the invention to provide a new and improved fuel system for a combustor to be associated with a turbine wheel. More specifically, it is an object of the invention to provide a fuel system for a stored energy system for operating an EPU or APU and that is not subject to lean flameout immediately following ignition.

An exemplary embodiment of the invention achieves the foregoing objects in a system for providing hot gases to drive a turbine wheel which includes a combustor having a hot gas outlet adapted to be connected to a nozzle for a turbine. A fuel inlet is provided for the combustor and a fuel flow control valve which includes downstream pressure responsive flow control means is operable to normally provide a selected pressure drop in fuel flow and a corresponding constant fuel flow rate. A conduit interconnects the inlet and the valve and means are provided for effectively isolating the valve from pressure surges in the combustor.

In a preferred embodiment, the effective isolating means comprises a restriction in the conduit interconnecting the inlet in the valve and more preferably, the restriction is in the form of an orifice.

In a highly preferred embodiment, the fuel inlet includes an air blast atomizing fuel injector.

The invention also contemplates use in a system including a turbine wheel adapted to rotate about an axis and having a nozzle in proximity to the turbine wheel for directing motive gases thereat. The combustor is connected to such nozzle.

According to another facet of the invention, there is provided a method of preventing lean flameout immediately following ignition in a combustor for a turbine, which includes a combustor having an air blast atomization fuel injector and a ΔP valve for controlling the flow of fuel to the injector. The method includes, according to one embodiment, the step of making the pressure drop due to resistance to fuel flow from the ΔP valve to the fuel injector large in relation to the desired pressure drop across the ΔP valve.

The invention contemplates that the step of making the resistance large be accomplished by placing an orifice in the path of fuel flow from the ΔP valve to the fuel injector.

Other objects and advantages will become apparent from the following specification taken in conjunction with the accompanying drawing.

DESCRIPTION OF THE DRAWING

The FIGURE is a schematic of a stored energy system made according to the invention.

DESCRIPTION OF THE PREFERRED EMBODIMENT

An exemplary embodiment of a stored energy system made according to the invention is illustrated in the drawing in the environment of an EPU. However, it should be understood that the invention is applicable to APUs and other turbine systems as well.

With reference to the drawing, a gas turbine wheel 10 is seen to be mounted on a shaft 12 to be rotatable about the axis defined thereby. The shaft 12 in turn is connected to a power unit 14 which may include an electrical generator, one or more hydraulic pumps, etc., which provide electrical or hydraulic energy for loads (not shown).

A nozzle is shown schematically at 16 in proximity to the turbine wheel 10 for directing motive gases against the same. The nozzle 16 is connected to the outlet 18 of a combustor, generally designated 20, to receive motive gases, including gases of combustion, therefrom.

The combustor 20 includes a first fuel inlet 22 remote from the outlet 18 and a second fuel inlet 24 in proximity to the outlet 18. Also included is an oxidant inlet 26.

As somewhat schematically illustrated in the FIGURE, the oxidant inlet 26 surrounds the fuel inlet 22. Advantageously, the high velocity of the oxidant as it enters the combustor 20 may be utilized to achieve a high degree of atomization of fuel entering by the fuel inlet 22 by use of any conventional air blast atomization fuel injector. Not untypically, such an injector surrounds the point of fuel release with a discharge opening for high velocity air under pressure to break up and atomize the fuel stream. In the present invention, the pressurized gas will be the oxidant which, as mentioned hereinafter, need not necessarily be air. Thus, the term "air blast atomization fuel injection" is not intended to be restricted to air, but only to denote a particular type of structure.

Fuel is provided to the inlets 22 and 24 from a fuel tank 28 as will be seen. The fuel tank 28 includes an internal bladder and a pressurizing inlet 32 connected to a source 34 of air under pressure via a control valve 36. When the valve 36 is opened, the bladder 32 will be pressurized to expel fuel from the tank 28 via an outlet 38. The fuel system also includes a relief valve 40 and a fill port 42 on the inlet side of the fuel tank 28.

The outlet 38 is connected to a vent cap 44 as well as a fill port 46 and a filter indicator 48. A fuel flow line 50 extends from the filter indicator 48 to a primary fuel flow control servo/$\Delta P$ valve 52 of a conventional construction and to a secondary fuel flow control servo/$\Delta P$ valve 54, also of conventional construction. The valve 52 is connected via a shut off valve 56 to the first inlet 22 while the valve 54 is connected via a shut off valve 60 to the second fuel inlet 24. As can be seen, the valves 58 and 60, when not establishing fluid communication from the valves 52 and 54 to the combustor 24 have connections to the source 34 which operate to purge the respective lines to prevent residual fuel from gumming up the fuel lines over a period of time.

The fuel injected into the combustor 20 at the first inlet 22 is atomized and combusted with oxidant received at the inlet 26 to provide hot gases of combustion. Fuel injected into the combustor outlet 18 by the second inlet 24 does not appreciably participate in the combustion process, if at all. Rather, the same is vaporized and/or thermally cracked by the hot gases of combustion resulting from fuel introduced at the inlet 22 to increase the volume and mass flow of the motive gases being applied to the turbine wheel 10 by the nozzle 16.

The source 34 may also be connected to an air atomization valve 62 which in turn is connected to the first inlet 22 to provide for air atomization of fuel thereat and to a purge line 64 for directing a purging flow to the combustor when fuel is not being flowed thereto. Also included is an ignitor 66.

The oxidant system includes a pressure vessel 70 which may be charged with an oxidant such as air, oxygen enriched air or even molecular oxygen in some instances. Charging is accomplished through a fill port 72 and fill valve 74. A pressure transducer 76 for monitoring the pressure of the charge of oxidant within the vessel 70 is also provided as is a pressure relief valve 78.

A line 80 extends from the outlet 82 of the vessel 70 to a shut-off valve 84. Downstream of the shut-off valve is a pressure regulator 86 which provides, when the shut-off valve 84 is opened, oxidant to a conduit 92 at constant pressure.

The conduit 92 in turn is connected to the oxidant inlet 26.

The conduit 92 includes an oxidant flow control servo valve 98 in series with a venturi 100. The venturi 100 acts as a choked orifice and minimizes flow losses in the conduit 92. A pressure transducer 102 and a temperature transducer 104 may also be connected to the branch 92 between the servo valve 98 and the venturi 100. The servo valve 98 is operable to vary the flow through the conduit 92 to achieve desired combustion conditions within the combustor 20 in response to signals received from a known servo control system 106. The signals are received on a line 108 and position feedback information is provided on a line 110.

The lines 112 and 114 respectively connect the temperature transducer 104 and pressure transducer 102 to the servo control 106 and a line 116 connects a speed sensor 118 associated with the shaft 12 to the servo control 106. The valves 52 and 54 are respectively connected to the servo control 106 by means of lines 120 and 122. Thus, loading on the turbine wheel 10 may be determined by determining shaft speed sensed by the sensor 116 and information to that effect provided to the servo control to vary fuel flow through the valves 52 and 54 as well as oxidant flow through the valve 98 as appropriate. Pressure variations as well as the effect on varying temperature on mass flow rate may be determined through use of the transducers 102 and 104 to provide suitable control information.

As mentioned previously, the valve 52 is a servo/$\Delta P$ valve of conventional construction. That is to say, its inner workings include a variable orifice along with a valve that is operable to control the pressure drop across the variable orifice in accordance with some sort of command. Any given commanded pressure drop will result in a constant flow rate associated with that particular pressure drop. And because pressure drop across the internal variable orifice is determined by the relationship of the pressure upstream of the valve 52 to the pressure downstream of the valve 52, it can be appreciated that any increase in the downstream pressure will decrease the pressure drop, thereby reducing the low rate of fuel through the valve 52.

In most cases, when an increase in pressure downstream of the valve 52 is felt, the servo/$\Delta P$ valve 52 responds rapidly to restore the desired pressure drop and thus maintain the desired fuel flow rate. However, where large changes in pressure occur suddenly, the valve 52 may not respond as rapidly as desired. In such a case, the flow of fuel through the valve 52 is reduced because of the reduced pressure drop. Thus, combustion within the combustor 20 goes "lean" and if the flow of fuel is not restored to an appropriate level promptly, a flameout due to lack of sufficient fuel, or so-called "lean flameout" occurs.

In starting up a system such as shown in the FIGURE, before ignition occurs within the combustor 20, the internal pressure thereat may be on the order of 100 psi. Immediately upon ignition of fuel in the combustor 20, the pressure jumps to approximately 300 psi. When such occurs, the pressure immediately downstream of the valve 52 rapidly escalates, changing the pressure drop across the valve 52; and such can result in lean flameout.

The problem may be accentuated where the fuel injector is an air blast atomization type of injector as is preferred. Frequently, fuel injectors of this type act almost like an eductor with the pressurized gas creating a very low pressure on the fuel 22, almost drawing the fuel out of the fuel line 22. This, of course, creates a very low pressure downstream of the valve 52 to begin with and maximizes the pressure drop associated with any given fuel flow rate.

To avoid the problem, the invention contemplates the provision of means for effectively isolating the servo/$\Delta$P valve 52 from large pressure surges occurring in the combustor 20 as when ignition of fuel is achieved during start up of the system. The invention provides for isolation of the valve 52 by intentionally incorporating a resistance in the fuel flow line between the valve 52 and the fuel inlet 22 to the combustor 20, preferably in the form of an orifice 130. The orifice 130 effectively creates a back pressure acting on the servo/$\Delta$P valve 52 at all times so that when the pressure surge occurs downstream of the orifice 130, it is in a large part isolated from the servo/$\Delta$P valve 52 by the presence of the orifice 130 and has a lesser effect on fuel flow. Consequently, while fuel flow may momentarily diminish somewhat, the diminishment is insufficient to result in a lean flameout.

Stated another way, placing the orifice 130 between the combustor 20 and the servo/$\Delta$P valve 52 increases the resistance to fuel flow between the two to the point where it becomes large in relation to the commanded pressure drop controlling flow through the servo/$\Delta$P valve. The surge in pressure that occurs in the combustor 20 upon ignition becomes relatively small in comparison to the pressure drop between the combustor 20 and the servo/$\Delta$P valve 52 and has a commensurately diminished effect on the operation of the servo/$\Delta$P valve 52.

Thus, through the relatively simple and inexpensive expedient of introducing the orifice 130 into the fuel flow path downstream of the servo/$\Delta$P valve, lean flameout upon ignition is avoided.

We claim:

1. A method of preventing lean flameout as a result of ignition in the combustor of a turbine including a combustor having an air blast atomization fuel injector, a fuel flow line connected to said injector and a $\Delta$P valve connected to said fuel flow line for controlling the flow of fuel to the injector through said fuel flow line, comprising the steps of providing a fuel flow restriction in said fuel flow line between said $\Delta$P valve and said injector, thereafter initiating the flow of fuel to said combustor and igniting said fuel within said combustor to start said turbine, said restriction being sized so as to substantially isolate the rate of fuel flowing through said fuel flow line from the effects of sudden pressure increase in said combustor associated with ignition therein.

2. A method of preventing lean flameout in the combustor of an emergency power unit for an aircraft operating at high altitude as a result of ignition of fuel in he combustor for starting purposes, the emergency power unit including a combustor having a air blast fuel injector for receiving fuel and an oxidant, a fuel storage vessel, an oxidant storage vessel for storing oxidant under high pressure for delivery to the combustor and a $\Delta$P valve for controlling the flow of fuel from said fuel storage vessel to the injector, and wherein the emergency power unit also includes a turbine wheel adapted to have gases of combustion from the combustor directed there against and a power unit connected to the turbine wheel to be driven thereby to generate power to be employed to regain or maintain the control of an airborne aircraft in an emergency situation, comprising the steps of:
  a) providing a fuel flow restriction in the fuel flow path between the $\Delta$P valve and the injector;
  b) determining the existence of an emergency situation, and thereafter initiating flow of fuel and oxidant from storage to the combustor; and
  c) igniting the fuel within the combustor and combusting the same with the oxidant;
  said restriction being sized such that the pressure drop due to the resistance of fuel flow from the $\Delta$P valve to the fuel injector is sufficiently large in relation to the pressure drop across $\Delta$P valve so as to prevent said combustion from ceasing as a result of sudden pressure increase in the combustor caused by said ignition.

* * * * *